(12) United States Patent
Ishikawa et al.

(10) Patent No.: US 9,862,612 B2
(45) Date of Patent: Jan. 9, 2018

(54) METHOD FOR PRODUCING SILICON METAL AND POROUS CARBON

(71) Applicant: SUMITOMO ELECTRIC INDUSTRIES, LTD., Osaka-shi, Osaka (JP)

(72) Inventors: Shinji Ishikawa, Yokohama (JP); Toru Adachi, Yokohama (JP); Taiichiro Yamashita, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 428 days.

(21) Appl. No.: 14/408,006

(22) PCT Filed: May 22, 2013

(86) PCT No.: PCT/JP2013/064265
§ 371 (c)(1),
(2) Date: Dec. 15, 2014

(87) PCT Pub. No.: WO2013/190945
PCT Pub. Date: Dec. 27, 2013

(65) Prior Publication Data
US 2015/0104370 A1 Apr. 16, 2015

(30) Foreign Application Priority Data
Jun. 20, 2012 (JP) .................. 2012-138849

(51) Int. Cl.
*C01B 33/033* (2006.01)
*C01B 33/021* (2006.01)
(Continued)

(52) U.S. Cl.
CPC ............ *C01B 33/033* (2013.01); *C01B 32/00* (2017.08); *C01B 32/05* (2017.08); *C01B 33/021* (2013.01)

(58) Field of Classification Search
CPC ..... C01B 33/00; C01B 33/033; C01B 33/021; C01B 31/00; C01B 31/02
See application file for complete search history.

(56) References Cited

U.S. PATENT DOCUMENTS

| 4,227,081 A | 10/1980 | Caputo et al. |
| 5,876,787 A | 3/1999 | Avarbz et al. |

(Continued)

FOREIGN PATENT DOCUMENTS

| CN | 101037199 | 9/2007 |
| CN | 101181990 | 5/2008 |

(Continued)

OTHER PUBLICATIONS

Wo2011089790, see machine translation.*

(Continued)

*Primary Examiner* — Melvin C Mayes
*Assistant Examiner* — Smita Patel
(74) *Attorney, Agent, or Firm* — Drinker Biddle & Reath LLP

(57) ABSTRACT

The method for producing silicon metal and porous carbon from rice hulls is provided. The method comprises a first step S1 of producing a rice hull charcoal M2 containing $SiO_2$ and C by heat treatment of rice hulls M1; a second step S4 of exposing the rice hull charcoal M4 to at least any one of heated first inert gas G2 or reducing gas to produce SiC; a third step S5 of exposing SiC to a heating atmosphere containing $Cl_2$ gas to produce $SiCl_4$ and porous carbon P1; a fourth step S7 of reacting $SiCl_4$ and Zn to produce silicon metal P2 and $ZnCl_2$; and a fifth step S9 of electrolyzing (Continued)

$ZnCl_2$ to produce Zn and $Cl_2$ gas. The $Cl_2$ gas in the fifth step S9 is used in the third step S5, and Zn in the fifth step S9 is used in the fourth step S7.

10 Claims, 14 Drawing Sheets

(51) Int. Cl.
  *C01B 32/00* (2017.01)
  *C01B 32/05* (2017.01)

(56) References Cited

U.S. PATENT DOCUMENTS

| | | |
|---|---|---|
| 2005/0227868 A1 | 10/2005 | Hinman et al. |
| 2010/0260869 A1 | 10/2010 | Gogotsi et al. |
| 2011/0176986 A1 | 7/2011 | Rosenkilde |

FOREIGN PATENT DOCUMENTS

| | | |
|---|---|---|
| CN | 101759187 | 6/2010 |
| JP | S58-55330 A | 4/1983 |
| JP | H01-249617 A | 10/1989 |
| JP | H01-249621 A | 10/1989 |
| JP | H05-43208 A | 2/1993 |
| JP | H08-26848 A | 1/1996 |
| JP | 2002-265257 A | 9/2002 |
| JP | 2003-529518 A | 10/2003 |
| JP | 2007-532468 A | 11/2007 |
| JP | 2008-105922 | 5/2008 |
| JP | 2008-214158 A | 9/2008 |
| JP | 2008-273816 A | 11/2008 |
| JP | 2011-006316 A | 1/2011 |
| JP | 2011-057457 A | 3/2011 |
| JP | 2011-530472 A | 12/2011 |
| WO | WO 2011/089790 | 7/2011 |

OTHER PUBLICATIONS

CN101181990, see machine translation.*
English-language translation of International Preliminary Report on Patentability (IPRP) dated Dec. 31, 2014 that issued in WO Patent Application No. PCT/JP2013/064265.

* cited by examiner

*Fig.4*
(a)
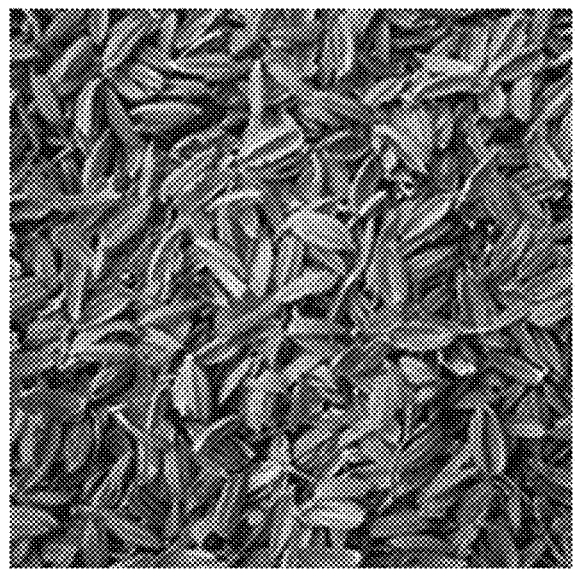
(b)

METHOD FOR PRODUCING SILICON METAL AND POROUS CARBON

TECHNICAL FIELD

The present invention relates to a method for producing silicon metal and porous carbon.

BACKGROUND ART

Methods for producing silicon carbide, amorphous silica, or silicon metal from rice hulls or carbide of rice hulls are conventionally known.

In Patent Literature 1, a method for continuously producing silicon carbide and silicon nitride from carbide of rice hulls is described. In the method, the carbide of rice hulls is heated while being transported in a heating zone under presence of an inert gas nonreactive with carbon.

In Patent Literature 2, a method for producing a molded product of porous silicon carbide including composite structure of silicon carbide whiskers and silicon carbide fine particles made from carbide of rice hulls is described. In the method, the surface of pulverized carbide of rice hulls is treated and the carbide is molded after surface treatment. The molded product is then heat treated for removal of carbonized components.

In Patent Literature 3, a method for producing silicon metal made from silicicolous plants such as rice hulls is described. In the method, silica ash obtained by firing silicicolous plants is reacted with a metal such as aluminum by heating in an inert gas atmosphere.

In Patent Literature 4, a method for producing a silica raw material from rice hulls is described. In the method, rice hull powder is treated with pressurized hot water to adjust the ratio of silica components to organic components in the rice hull powder.

In Patent Literature 5, a method for producing high purity amorphous silica from rice hulls is described. In the method, rice hulls are treated with acetic acid-containing solution to separate alkaline components from the rice hulls. After separation of alkaline components, the rice hulls are washed and dried. The dried rice hulls are carbonized to form rice hull charcoal. The rice hull charcoal is fired to produce high-purity silica.

In Patent Literature 6, a method for producing active carbon is investigated focusing on carbon components of rice hulls. A hydrogen absorption method is described, including the steps of: carbonizing carbon material; subjecting the carbonized carbon material obtained in the previous step to alkali activation, accommodating the porous carbon made in the alkali activation step in a vessel, and introducing hydrogen into the interior of the vessel so as to have a pressure of 0.5 to 6 MPa in equilibrium state, while keeping the temperature in the interior of the vessel in the range of 77 to 150 K. The process has a problem that silica components are melted with an alkali salt and discarded.

CITATION LIST

Patent Literature

Patent Literature 1: Japanese Patent Application Laid-Open Publication No. H05-43208;
Patent Literature 2: Japanese Patent Application Laid-Open Publication No. H08-26848;
Patent Literature 3: Japanese Patent Application Laid-Open Publication No. 2011-6316;
Patent Literature 4: Japanese Patent Application Laid-Open Publication No. 2002-265257;
Patent Literature 5: Japanese Patent Application Laid-Open Publication No. 2008-214158; and
Patent Literature 6: Japanese Patent Application No. 2009-205255.

SUMMARY OF INVENTION

Technical Problem

As described above, a method for producing silicon carbide is described in Patent Literature 1 and 2, a method for producing silicon metal is described in Patent Literature 3. A method for producing a silica raw material is described in Patent Literature 4. A method for producing amorphous silica is described in Patent Literature 5.

Even though rice hulls contain silicon and carbon, effective utilization of both silicon and carbon is not achieved by the production methods in Patent Literature 1 to 5, which use silicon as raw material for silicon carbide, silicon metal, and silica raw material. Accordingly, the methods described in Patent Literature 1 to 5 include a step for removing unutilized carbon. The removing step requires a treatment liquid such as an acid solution or an alkali solution for removal treatment or energy for heat treatment.

It is an object of the present invention, in view of these circumstances, to provide a method for producing silicon metal and porous carbon from rice hulls.

Solution to Problem

The method for producing silicon metal and porous carbon of the present invention includes: a first step of producing a rice hull charcoal containing silicon oxide and carbon by heat treatment of rice hulls; a second step of exposing the rice hull charcoal to at least any one of heated first inert gas or reducing gas to produce silicon carbide; a third step of exposing the silicon carbide to a heating atmosphere containing chlorine gas to produce silicon tetrachloride and porous carbon; a fourth step of reacting the silicon tetrachloride and zinc metal to produce silicon metal and zinc chloride; and a fifth step of electrolyzing the zinc chloride to produce zinc metal and chlorine gas, wherein the chlorine gas in the fifth step is used in the third step, and the zinc metal in the fifth step is used in the fourth step.

In the production method, rice hull charcoal containing silicon oxide and carbon is produced from rice hulls, and silicon carbide is produced from the rice hull charcoal. Silicon carbide is then reacted with chlorine gas to produce porous carbon and silicon tetrachloride. Subsequently silicon tetrachloride is reacted with zinc to produce silicon metal and zinc chloride. Chlorine gas and zinc metal are produced by the electrolysis of zinc chloride. The chlorine gas, i.e. one product of the electrolysis, is used in production of the porous carbon. The zinc metal, i.e. another product of the electrolysis, is used in production of silicon metal. Consequently the production method allows for production of porous carbon and silicon metal from rice hulls.

In the first step of the production method of the present invention, the number of moles of carbon in the produced composition of the rice hull charcoal is triple or more the number of moles of $SiO_2$. When the ratio of the number of moles of carbon to that of $SiO_2$ is less than triple, $SiO_2$ remains in the subsequent reaction, resulting in impurities in porous carbon. Accordingly, the ratio of the number of moles of carbon to that of $SiO_2$ that is triple or more allows for the formation of SiC having a high content of a carbon component, resulting in fewer impurities in the porous carbon as a final product.

In the production method of the present invention, the rice hull charcoal is treated with an acid solution prior to the second step. Impurities contained in the rice hull charcoal are removed by the treatment with an acid solution, and thus the purity of silicon oxide and carbon contained in the rice hull charcoal is increased. Consequently the amount of chlorine gas reacting with impurities in the third step is reduced, and thus the amount of chlorine gas required in the third step can be reduced.

In the second step of the production method of the present invention, the first inert gas contains at least one of Ar and He, and the rice hull charcoal obtained in the first step is heated to a temperature of 1200° C. or higher and 2000° C. or lower. In the temperature range of 1200° C. or higher and 2000° C. or lower, the reaction between silicon oxide and carbon is accelerated, and thus silicon carbide can be efficiently produced.

Also, in the second step of the production method of the present invention, the reducing gas contains at least one of $H_2$ and CO, and the rice hull charcoal obtained in the first step is heated to a temperature of 1200° C. or higher and 2000° C. or lower. In the temperature range of 1200° C. or higher and 2000° C. or lower, the reaction between silicon oxide and carbon is accelerated, and thus silicon carbide can be efficiently produced. In addition, $H_2$ gas and CO gas accelerate the reaction between silicon oxide and carbon, and thus silicon carbide can be further efficiently produced.

Also, in the second step of the production method of the present invention, the silicon carbide is produced under a pressure of less than 1 atm. Since the pressure in the treatment vessel is set to a pressure of less than the atmospheric pressure, impurities having low vapor pressure can be removed from rice hull charcoal.

In the third step of the production method of the present invention, the heating atmosphere contains a mixed gas of the chlorine gas and a second inert gas or the chlorine gas.

Also, in the third step of the production method of the present invention, the atmosphere containing the chlorine gas is heated to a temperature of 1000° C. or higher and 1600° C. or lower. With a heating temperature of 1000° C. or higher, the reaction between chlorine gas and silicon carbide can be accelerated. With a heating temperature of 1600° C. or lower, the structure of porous carbon to be produced can be prevented from being graphitized, and reduction in the surface area of porous carbon can be suppressed.

The fourth step of the production method of the present invention includes the steps of: heating the silicon tetrachloride to a temperature of 600° C. or higher and 1100° C. or lower to generate gas of the silicon tetrachloride; reacting the gas of silicon tetrachloride with vapor of the zinc metal to produce the silicon metal and the zinc chloride; and cooling the zinc chloride to liquefy the zinc chloride. The reaction between silicon tetrachloride and zinc metal can be thus accelerated.

Also, in the third step of the production method of the present invention, the gas of silicon tetrachloride is discharged from the heating atmosphere to separate the silicon tetrachloride from the porous carbon. The porous carbon and the silicon tetrachloride can be easily separated.

Also, in the fourth step of the production method of the present invention, gas of the zinc chloride is discharged from the atmosphere containing the gas of silicon tetrachloride and vapor of the zinc metal to separate the zinc chloride from the silicon metal. The silicon metal and the zinc chloride can be easily separated.

Advantageous Effects of Invention

According to the present invention, a method for producing silicon metal and porous carbon from rice hulls is provided.

BRIEF DESCRIPTION OF DRAWINGS

FIG. 4 (a) is an exemplary view of rice hulls, and FIG. 4 (b) is an exemplary view of rice hull charcoal;

DESCRIPTION OF EMBODIMENTS

With reference to the accompanying drawings, embodiments of the method for producing silicon metal and porous carbon of the present invention is described in detail in the following. The same reference symbols are used to denote the same elements, and redundant description is omitted in the description of the drawings.

Figure 1:
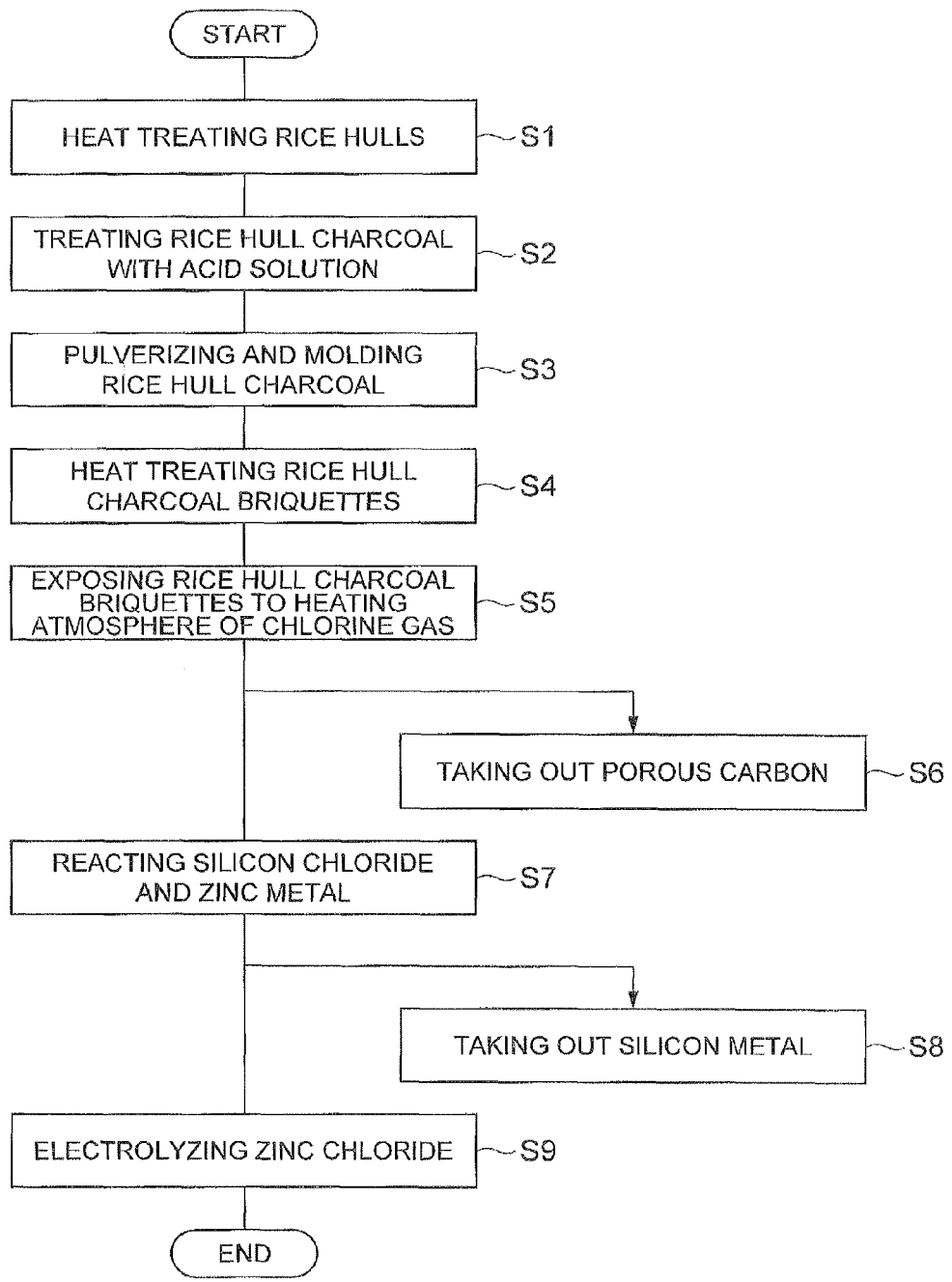
FIG. 1 is a diagram showing main processes of the method for producing silicon metal and porous carbon in an embodiment.
Figure 2:
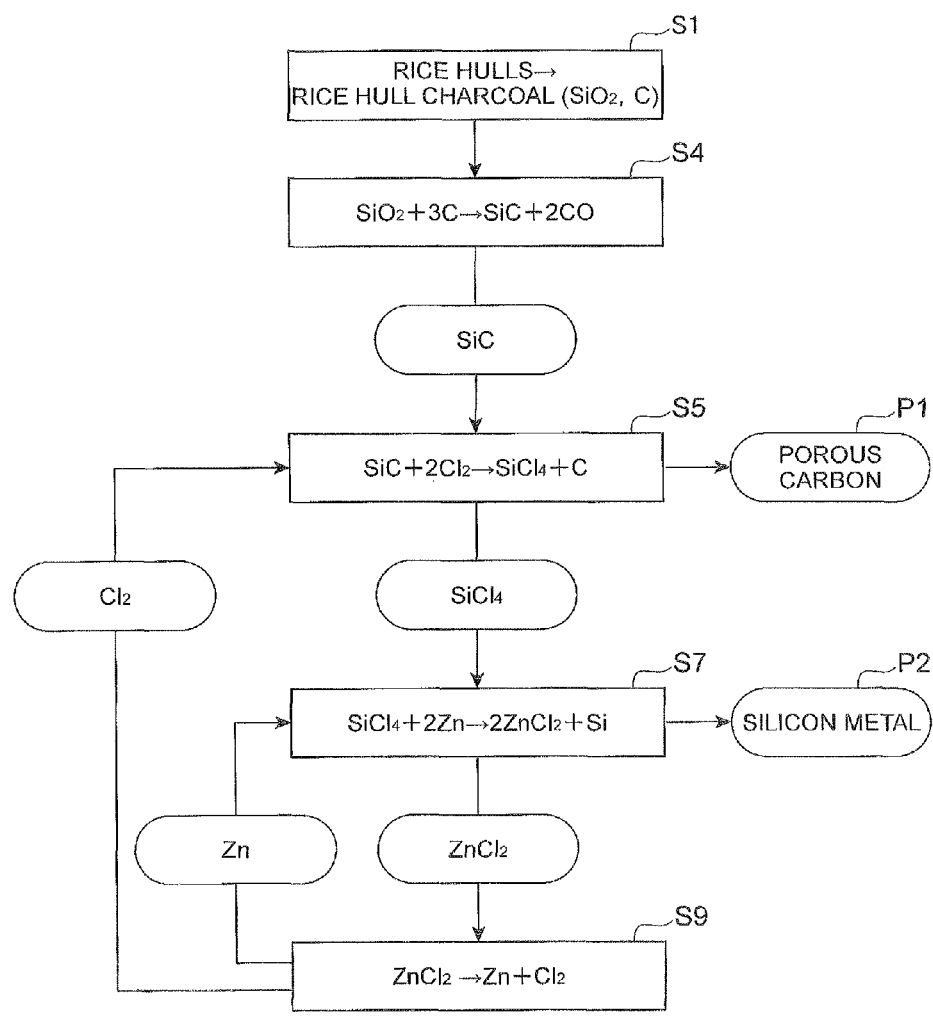
FIG. 2 is a diagram showing main processes of the method for producing silicon metal and porous carbon in an embodiment.

In the method for producing silicon metal and porous carbon of the present embodiment, silicon metal and porous carbon are produced from rice hulls. FIG. 1 and FIG. 2 are diagrams showing main processes of the method for producing silicon metal and porous carbon in an embodiment. As shown in FIG. 1, the production method of the present embodiment includes: a step S1 of heat treating rice hulls; a step S2 of treating rice hull charcoal with an acid solution; a step S3 of pulverizing and molding the rice hull charcoal;

a step S4 of heat treating rice hull charcoal briquettes; a step S5 of exposing the rice hull charcoal briquettes to a heating atmosphere including chlorine gas ($Cl_2$ gas); a step S6 of taking out porous carbon (C); a step S7 of reacting silicon tetrachloride ($SiCl_4$) with zinc metal (Zn); a step S8 of taking out silicon metal (Si); and a step S9 of electrolyzing zinc chloride ($ZnCl_2$). These steps S1 to S9 are repeated to continuously produce porous carbon and silicon metal.

In the step S1 of heat treating rice hulls (a first step), silicon (Si) contained in rice hulls is oxidized to produce rice hull charcoal mainly composed of silicon oxide ($SiO_2$) and carbon (C). The rice hull charcoal contains $SiO_2$ with a weight ratio of about 50% and C with a weight ratio of about 40%. The rice hull charcoal contains a mixture of, for example, hydrogen, nitrogen, potassium, calcium, sodium, manganese, iron, and zinc, other than $SiO_2$ and C. The mixture is mainly composed of alkali metals such as potassium, calcium, and sodium.

Figure 3:
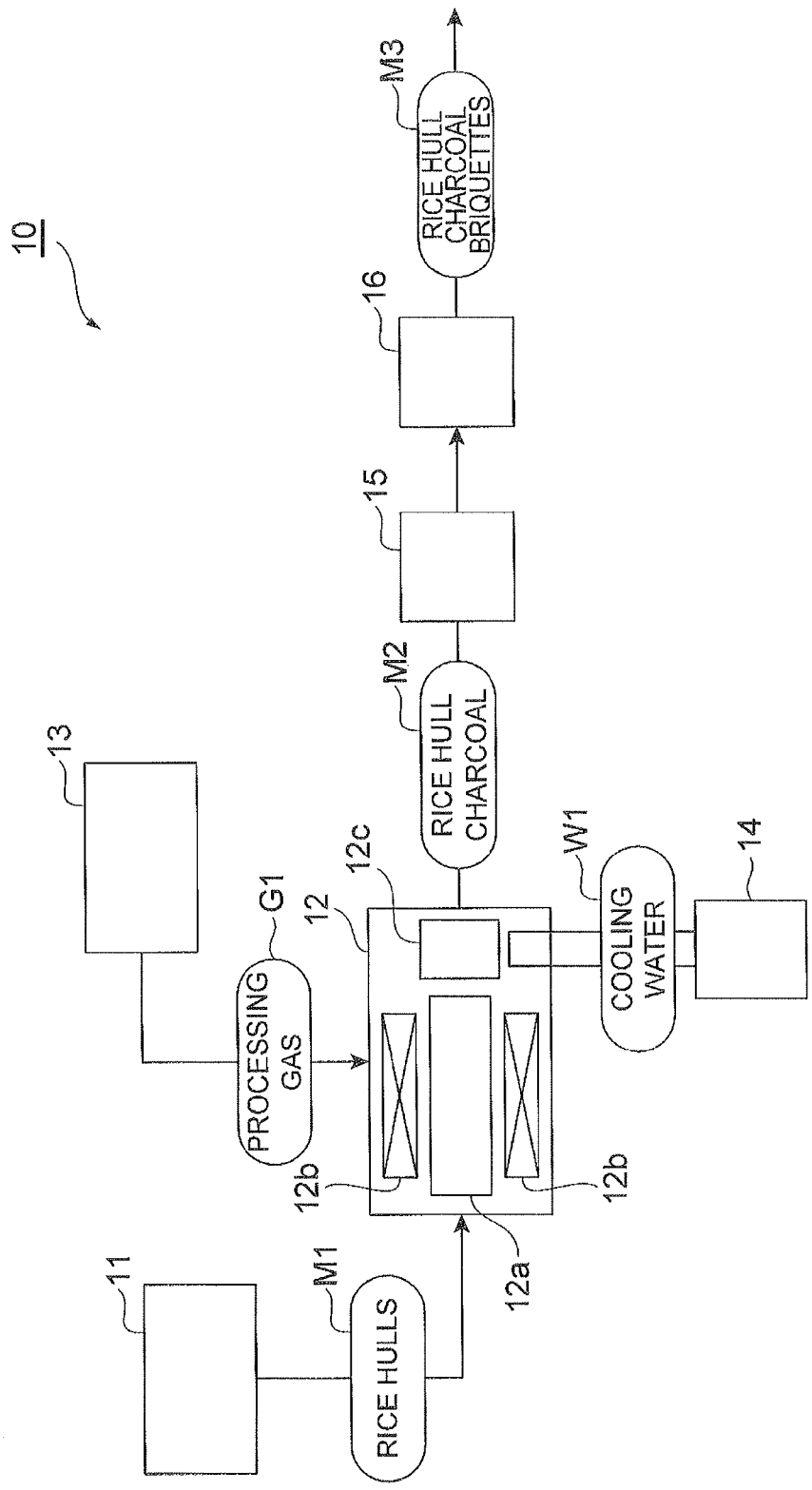
FIG. 3 is a schematic diagram showing the constitution of a rice hull processing device for use in the production method in an embodiment.

FIG. 3 is a schematic diagram showing the constitution of a rice hull processing device 10 for use in the steps S1 to S3. The rice hull processing device 10 includes a storage part 11 for storing rice hulls M1 (refer to FIG. 4 (a)), and a carbonization furnace 12, a gas supply part 13 which supplies a processing gas G1 to the carbonization furnace 12, a water supply part 14 which supplies cooling water W1 to the carbonization furnace 12, a solution treatment part 15 for treating rice hull charcoal M2 (refer to FIG. 4 (b)), and a molding part 16 for processing the solution treated rice hull charcoal M2 into a pellet form.

The carbonization furnace 12 includes a heat treatment part 12a for accommodating the rice hulls M1, and a heater 12b for heating the rice hulls M1 in the heat treatment part 12a. Also, the carbonization furnace 12 further includes a cooling part 12c for halting the combustion of rice hulls M1 treated in the heat treatment part 12a. Cooling water W1 is supplied to the cooling part 12c from the water supply part 14, and the rice hulls M1 are cooled to a predetermined temperature in the cooling part 12c. The gas supply part 13 supplies a processing gas G1 to the heat treatment part 12a of the carbonization furnace 12. The processing gas G1 is a gas having low reactivity with Si and C contained in the rice hulls M1.

In the step S1, the rice hulls M1 are firstly supplied to the carbonization furnace 12 from the storage part 11, and the rice hulls M1 are accommodated in the heat treatment part 12a of the carbonization furnace 12. Subsequently, while the processing gas G1 is being supplied to the heat treatment part 12a from the gas supply part 13, the rice hulls M1 are heated with the heater 12b. In the present embodiment, the processing gas G1 is composed of an inert gas such as $N_2$ and atmospheric gas in an amount insufficient for complete combustion of the rice hulls M1, and the rice hulls M1 are exposed to the heating atmosphere at 500° C. to 1000° C. The rice hulls M1 are heated in an atmosphere having insufficient oxygen for the complete combustion of the rice hulls M1, and thus incompletely combusted, or charred as it is called. The heated rice hulls M1 are transferred to the cooling part 12c to be cooled to a predetermined temperature. The heat treated and then cooled rice hulls M1 make the rice hull charcoal M2, which is then transferred to the solution treatment part 15.

The ratio of carbon to $SiO_2$ in the rice hull charcoal is an important parameter based on the stoichiometric relationship in the subsequent reaction. If the ratio of the number of moles of carbon to that of $SiO_2$ is less than triple, $SiO_2$ remains in the subsequent reaction, thereafter becoming impurities in porous carbon. Accordingly, the ratio of the number of moles of carbon to that of $SiO_2$ must be triple or more in light of the stoichiometric ratio of $SiO_2+3C \rightarrow SiC+2CO$. However, as an excessively high ratio of the number of moles prohibits the porous carbon from having a predetermined fine pore distribution, the ratio of the number of moles is preferably about quadruple at the most.

The step S2 of treating the rice hull charcoal M2 with an acid solution is performed. In the step S2, the rice hull charcoal M2 produced in the carbonization furnace 12 is treated in the solution treatment part 15 for removal of impurities such as alkali components and phosphorus contained in the rice hull charcoal M2. In the present embodiment, the rice hull charcoal M2 is treated with an acid solution such as hydrochloric acid (HCl).

Since silicon carbide is required to be used as abrasive and heat-resistant material, uniformity of particle size and densification of particles are demanded. Although a production method of silicon carbide for imparting a function such as porosity has been established, the produced silicon carbide has poor characteristics for industrial use. As a result, a high-pressure treatment to make a dense body and addition of additives are required.

In the present embodiment, the step S3 of pulverizing and molding rice hull charcoal M2 is performed. The rice hull charcoal M2 treated in the solution treatment part 15 is molded into a rice hull charcoal briquette M3 having a predetermined shape in the molding part 16. In the molding part 16, the rice hull charcoal M2 holding the shape of the rice hulls M1 is firstly pulverized. An average particle diameter of the pulverized rice hull charcoal M2 is 0.1 μm to 10 μm. In the pulverization, the particle diameter of the rice hull charcoal M2 is controlled to a constant value, and thus the treatment process in the subsequent step can be stabilized. The pulverized rice hull charcoal M2 is molded into, for example, a rice hull charcoal briquette M3 in a pellet form. The molding allows for easy transportation of the rice hull charcoal briquette M3. The step S3 may be performed on an as needed basis. Alternatively, the rice hull charcoal M2 may be utilized in a subsequent step without being molded into the rice hull charcoal briquette M3. In the following description, the rice hull charcoal briquette M3 is described.

In the step S4 of heat treating the rice hull charcoal briquette M3 (a second step), $SiO_2$ and C contained in the rice hull charcoal briquette M3 are reacted with each other to produce silicon carbide (SiC). In FIG. 2, the reaction formula (1) is shown to express the reaction in the step S4. The free energy in the reaction is expressed: $\Delta G=-77$ kJ.

$$SiO_2+3C \rightarrow SiC+2CO \tag{1}$$

The reaction expressed by the reaction formula (1) may be accelerated by using a reducing gas as processing gas G2, in the heating atmosphere at a temperature of 1700° C. or lower. Although the reaction expressed by the reaction formula (1) hardly proceeds at 1700° C. or lower due to the positive standard free energy of the formation, a reducing gas, i.e. the processing gas G2 including $H_2$, CO or the like, accelerates the reaction for producing SiC. On the other hand, in the heating atmosphere at a temperature of 1700° C. or higher, the processing gas G2 is not required to be a reducing gas.

Figure 11A:
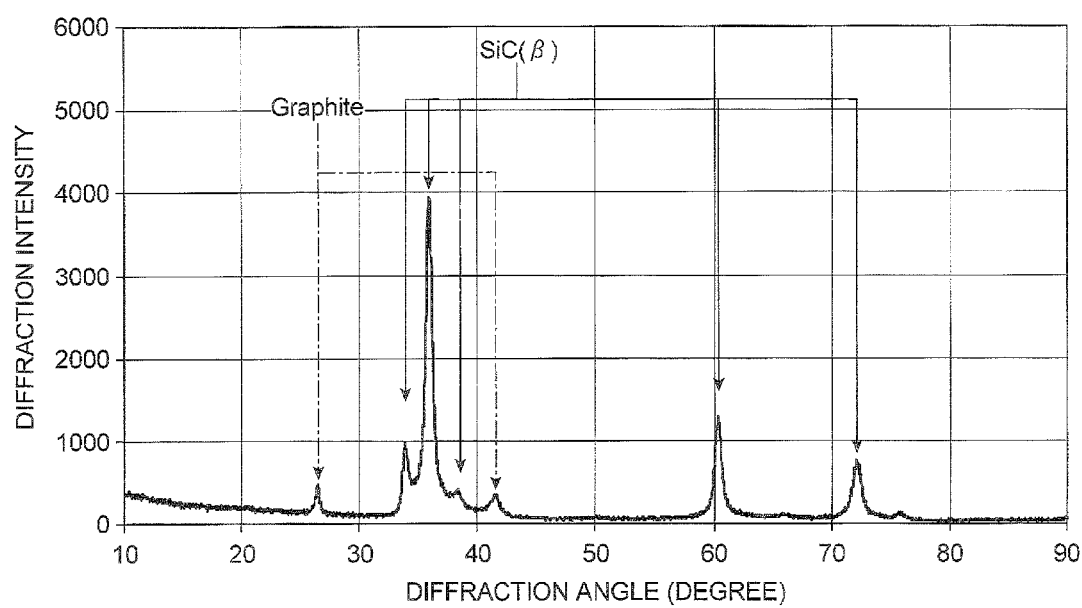
FIG. 11A is a chart showing an X-ray diffraction (XRD) waveform of a product.
Figure 11B:
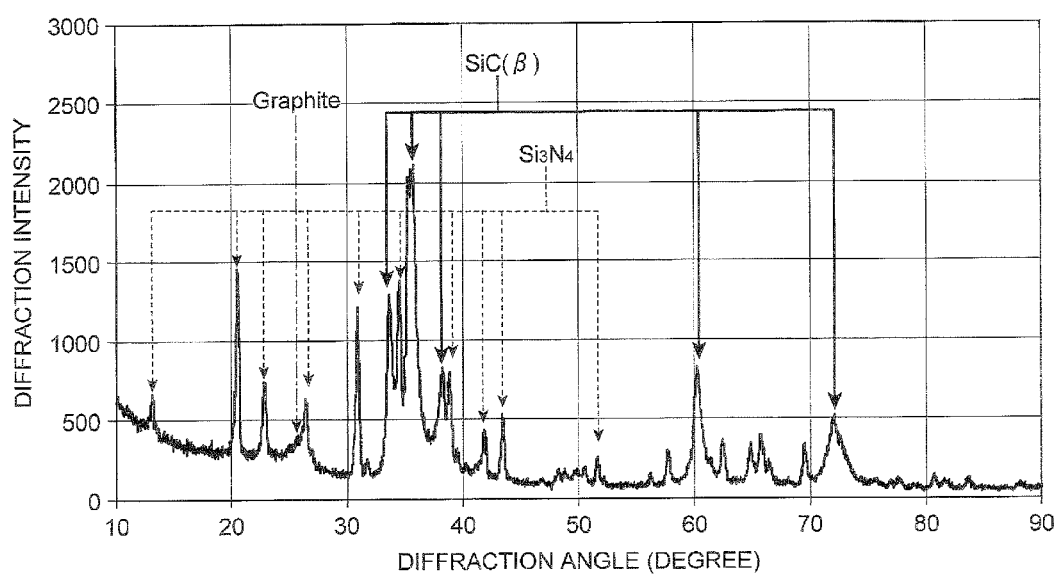
FIG. 11B is a chart showing an X-ray diffraction (XRD) waveform of a product.
Figure 12:
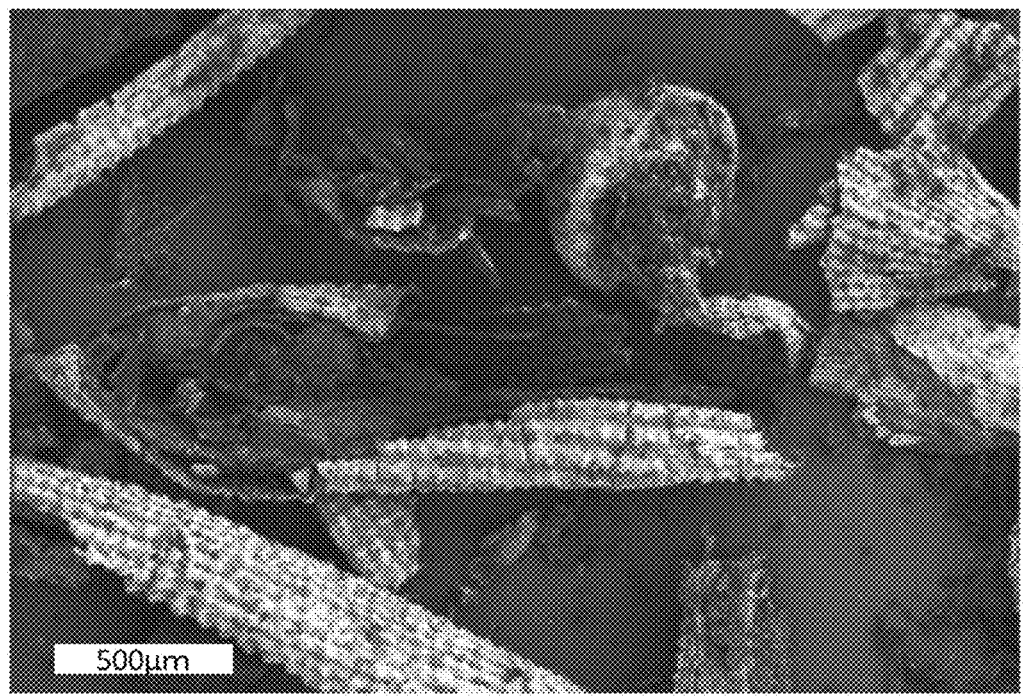
FIG. 12 is a microscopic photograph of a product.

In the case of using $N_2$ as the processing atmospheric gas, SiO vapor may react with $N_2$ to produce nitrides such as $Si_3N_4$, $SiON_2$, and the like, in some cases. In order to suppress the reactions, it is required to reduce the supply amount of $N_2$ or to use a rare gas such as Ar and He having no reactivity as the atmospheric gas. FIG. 11A is a chart showing an X-ray diffraction (XRD) waveform of a product from rice hull charcoal having a ratio of the number of moles of $SiO_2$ to that of carbon in raw material of 1:3.1 (i.e. the number of moles of carbon is 3.1 times the number of moles of $SiO_2$), treated in an atmospheric gas of He under normal pressure at 1550° C. The abscissa represents diffraction angle, and the ordinate represents diffraction intensity (unit: CPS (count number)). The main product is β-type silicon carbide, and a small amount of graphite is formed. In FIG. 11B for the same raw material as in FIG. 11A in an atmospheric gas of $N_2$, the formation of $Si_3N_4$ is observed other than the formation of SiC. FIG. 12 is a microscopic photograph of the product shown in the XRD waveform in FIG. 11A, from which remained rice hull structure can be identified.

Since CO gas is generated in the reaction of the reaction formula (1), the reaction is further accelerated by reducing the pressure in a reacting furnace 21. Furthermore, by reducing the pressure in the reaction furnace 21, alkali and phosphorus impurities such as alkali metals (Na and K) and phosphorus compounds ($P_2O_5$ and $P_4$) having a low vapor pressure are removed.

Figure 5:
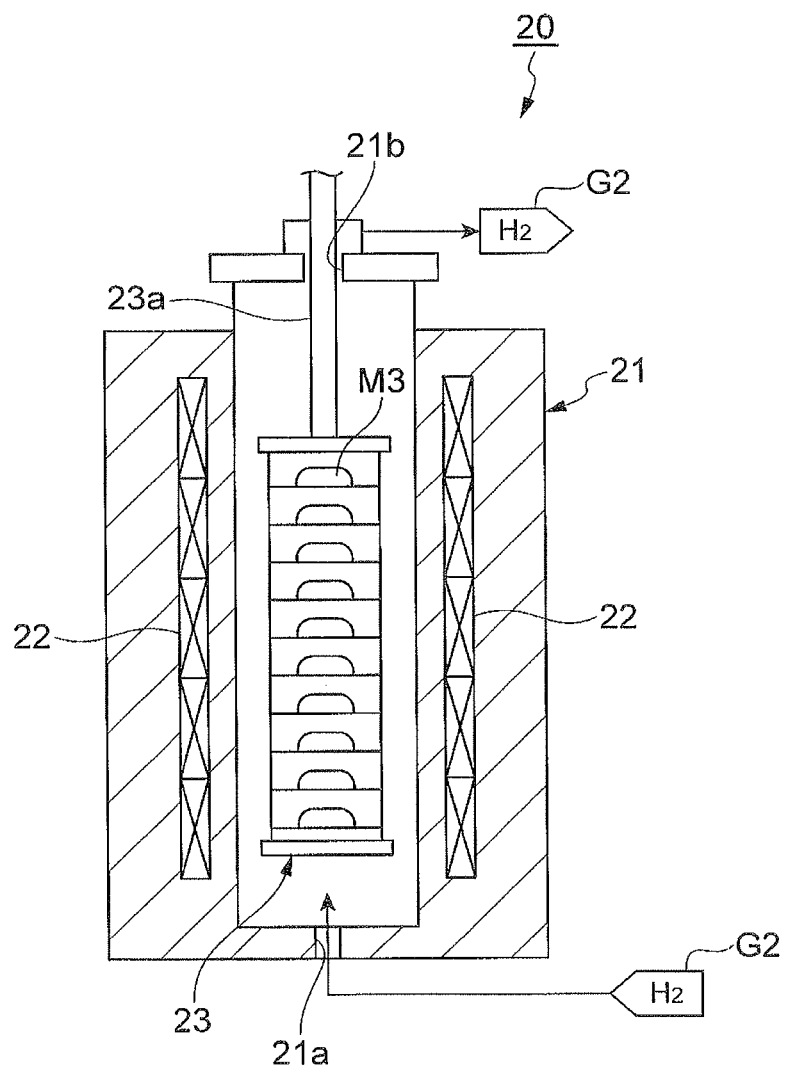
FIG. 5 is a schematic diagram showing the constitution of a processing device for processing the rice hull charcoal briquette, which is used in the production method in an embodiment.
Figure 6:
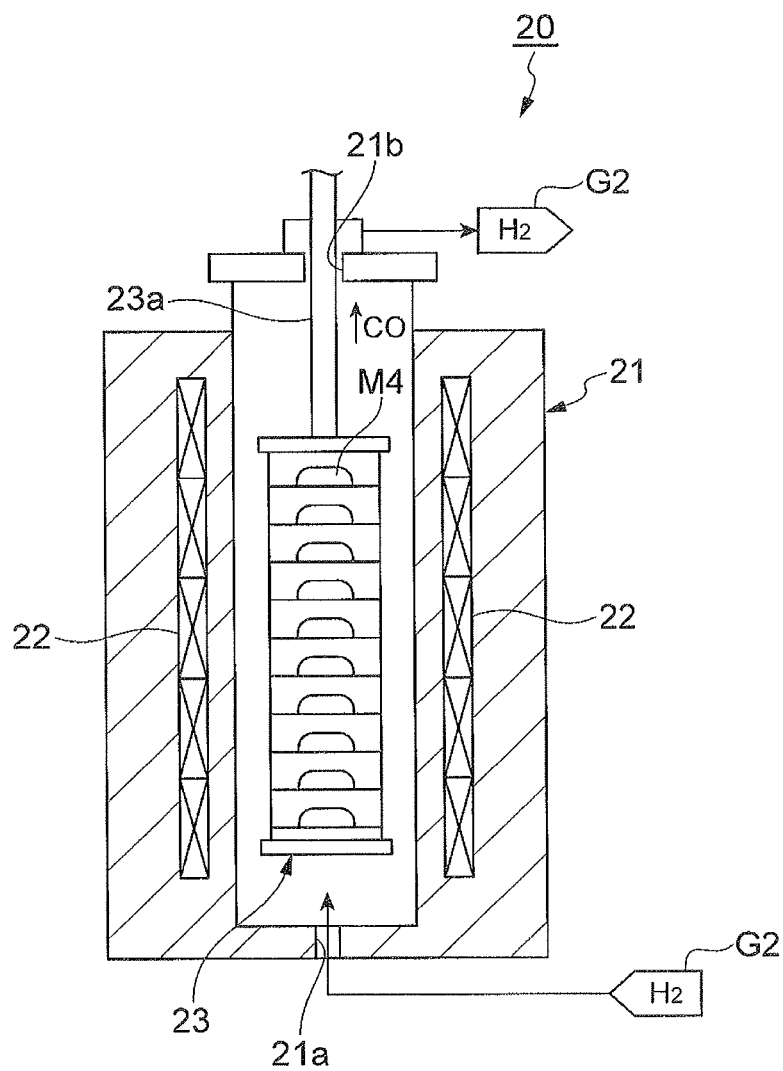
FIG. 6 is a schematic diagram showing the constitution of a processing device for processing the rice hull charcoal briquette, which is used in the production method in an embodiment.

FIG. 5 and FIG. 6 are schematic diagrams showing the constitution of a processing device 20 for processing the rice hull charcoal briquette M3, which is used in the step S4. With reference to FIG. 5, the processing device 20 includes the reacting furnace 21 which extends vertically, a heater 22 embedded in the side wall of the reacting furnace 21, and a shelf 23 disposed in the reacting furnace 21. In the shelf 23, a plurality of rice hull charcoal briquettes M3 are placed on each stage. In the present embodiment, the shelf 23 is suspended from above and supported by a supporting rod 23a.

The reacting furnace 21 is provided with an inlet port 21a at the bottom, through which the processing gas G2, i.e. a first inert gas or a reducing gas, is introduced. A gas including at least one of $H_2$, $N_2$, Ar, He, and CO can be used as the processing gas G2, $H_2$ gas may be used as the processing gas G2. With use of $H_2$ gas, silicon monoxide (SiO) produced by the reaction of $SiO_2$ with $H_2$ can accelerate the reaction represented by the reaction formula (1). The processing gas G2 moves upward in the reacting furnace 21, then being discharged from a discharge port 21b disposed at the top of the reacting furnace 21. The heater 22 is disposed to surround the periphery of the shelf 23, and heats the rice hull charcoal briquettes M3 placed in the shelf 23.

In the step S4, the rice hull charcoal briquettes M3 are firstly placed in the shelf 23. Subsequently, the processing gas G2 is heated with the heater 22, while being supplied into the reacting furnace 21 from the inlet port 21a. In the present embodiment, the processing gas G2 is $H_2$ gas, and the rice hull charcoal briquettes M3 are exposed to the heating atmosphere at a temperature of 1200° C. or higher and 2000° C. or lower for 2 to 10 hours. The pressure in the reacting furnace 21 is set to a pressure of, for example, less than 1 atm. The heating causes the reaction of the reaction formula (1), and the rice hull charcoal briquette M4 is produced from the rice hull charcoal briquette M3 (refer to FIG. 6). The rice hull charcoal briquette M4 contains SiC. Carbon monoxide (CO) produced concurrently with the SiC is discharged from the discharge port 21b disposed at the top of the reacting furnace 21 together with the processing gas G2. After completion of heating, the rice hull charcoal briquettes M4 are taken out from the shelf 23.

Subsequently, the step S5 (a third step) of exposing the rice hull charcoal briquettes M4 to the heating atmosphere including chlorine gas ($Cl_2$) is performed. In the step S5, SiC, i.e. a compound of Si and C, and $Cl_2$ gas are contacted with each other in heat treatment, producing porous carbon P1 from the rice hull charcoal briquettes M4. In FIG. 2, a reaction formula (2) is shown to express the reaction in the step S5. The free energy in the reaction is expressed: $\Delta G=-430$ kJ.

$$SiC+2Cl_2 \rightarrow SiCl_4+C \qquad (2)$$

In the step S5, Si of SiC reacts with $Cl_2$ gas to produce $SiCl_4$, with Si escaping from SiC. In the reaction, Si escapes from the rice hull charcoal briquette M4, and porous carbon P1 having porous carbon structure is produced. Also, in the step S5, $SiCl_4$ is produced together with porous carbon P1. The $SiCl_4$ is collected when cooled to about room temperature by, for example, a cooling device.

Figure 7:
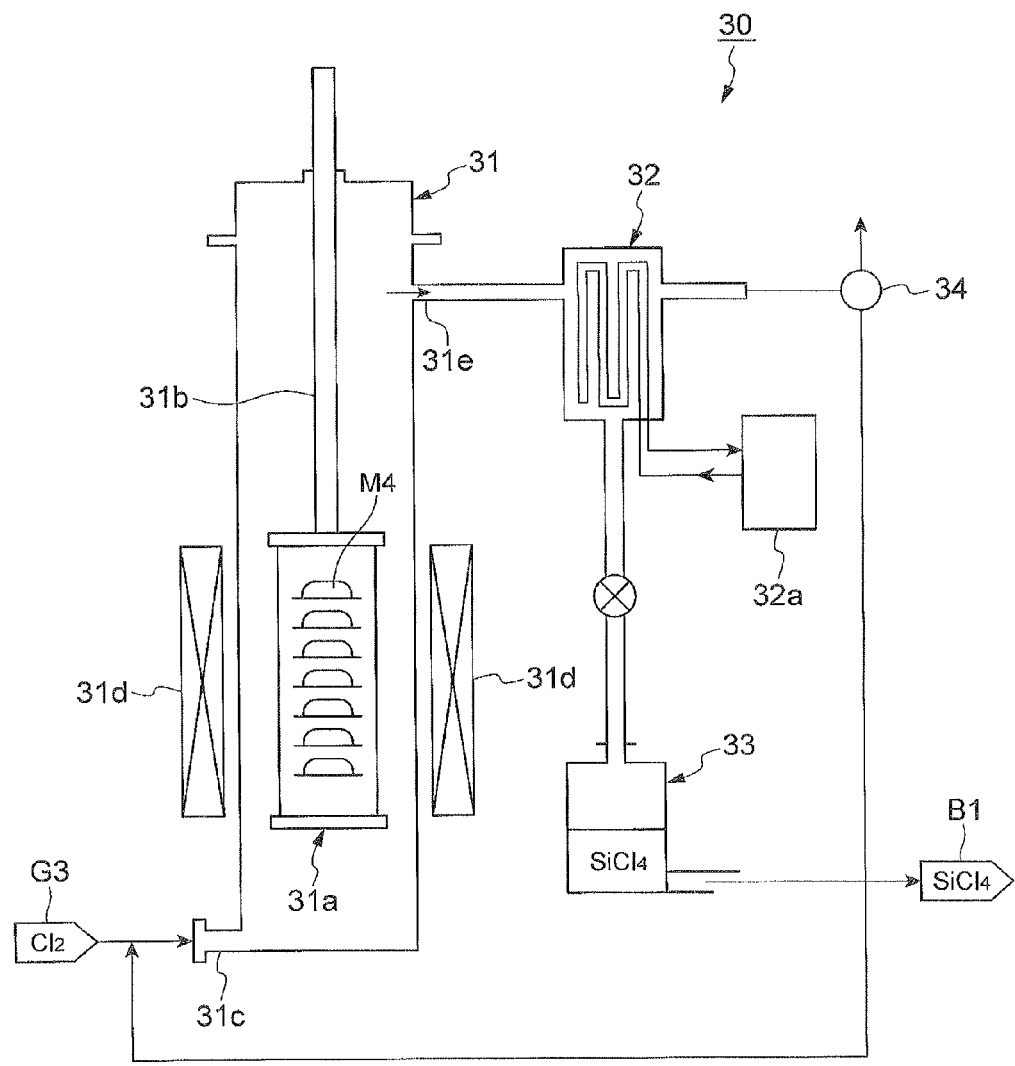
FIG. 7 is a schematic diagram showing the constitution of a processing device for processing the rice hull charcoal briquette, which is used in the production method in an embodiment.
Figure 8:
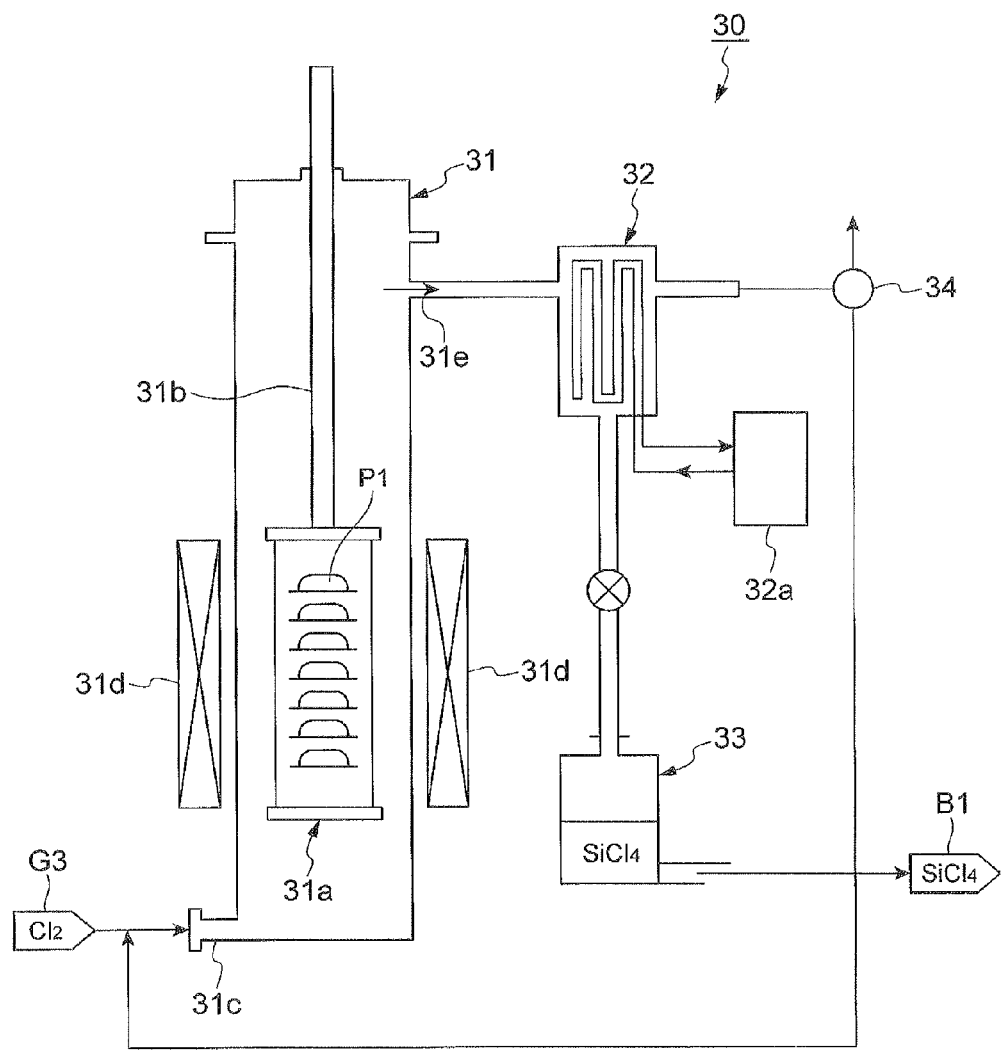
FIG. 8 is a schematic diagram showing the constitution of a processing device for processing the rice hull charcoal briquette, which is used in the production method in an embodiment.

FIG. 7 and FIG. 8 are schematic diagrams showing the constitution of a processing device 30 for processing the rice hull charcoal briquette M4, which is used in the step S5. As the processing device 30 for processing the rice hull charcoal briquette M4, for example, a dehydration sintering furnace for use in dehydration of a porous preform of optical fiber may be used. With reference to FIG. 7, the processing device 30 includes a reacting furnace 31, a cooling trap 32, and a reservoir tank 33.

The reacting furnace 31 is provided with a shelf 31a. A plurality of rice hull charcoal briquettes M4 are placed on each stage in the shelf 31a. The shelf 31a is suspended from above and supported by a supporting rod 31b. The reacting furnace 31 is provided with a gas inlet port 31c at a part lower than the shelf 31a. A processing gas G3 is supplied to the reacting furnace 31 through the gas inlet port 31c. The processing gas G3 in the present embodiment is a mixed gas of $Cl_2$ gas and a second inert gas, or substantially 100% $Cl_2$ gas. In the present embodiment, nitrogen ($N_2$), argon (Ar), helium (He), and the like may be used as the second inert gas.

On the outside of the reacting furnace 31, a heater 31d is disposed to surround the shelf 31a. The atmosphere containing $Cl_2$ gas around the rice hull charcoal briquettes M4 is heated to, for example, a temperature of 1000° C. or higher and 1600° C. or lower by the heater 31d. A gas discharge port 31e is disposed at the top of the reacting furnace 31. The gas discharge port 31e is connected to the cooling trap 32. The exhaust gas from the reacting furnace 31 is cooled at, for example, minus 10° C. or lower with a cooling medium 32a circulating in the cooling trap 32. Since $Cl_2$ gas has a boiling point of minus 34° C., being easily separated from $SiCl_4$.

In the step S5, the rice hull charcoal briquettes M4 are firstly placed in the shelf 31a. Subsequently the processing gas G3 is heated with the heater 31d, while being supplied into the reacting furnace 31 from the gas inlet port 31c. In the present embodiment, the processing gas G3 is $Cl_2$ gas, and the rice hull charcoal briquettes M4 are exposed to the heating atmosphere at a temperature of 1000° C. or higher and 1600° C. or lower, or 1100° C. or higher and 1300° C. or lower, for 60 to 600 minutes. By the heating, the reaction of the reaction formula (2), shown in FIG. 8, is caused, Si escapes from SiC, and porous carbon P1 is produced in the shelf 31a. After the step S5, the porous carbon P1 is taken out from the shelf 31a (the step S6).

The $SiCl_4$ produced from the reaction of the reaction formula (2) and the processing gas G3 are discharged from the gas discharge port 31e to the cooling trap 32 outside the reacting furnace 31. The $SiCl_4$ liquefied in the cooling trap 32 is reserved in the reservoir tank 33, and then transferred to a reduction device 40 (refer to FIG. 9 and FIG. 10) (reference symbol B1 in FIG. 8). The processing gas G3 passing through the cooling trap 32 is exhausted outside the processing device 30 for processing the rice hull charcoal briquette M4 or transferred again to the gas inlet port 31*c* of the reacting furnace 31, via a three way valve 34.

By the reaction between SiC and $Cl_2$, Si escapes from SiC, and pores are formed in the void region. The reaction of the reaction formula (2) proceeds well at a temperature of 1000° C. or higher. The specific surface area of the produced porous carbon P1 has temperature dependency, and porous carbon P1 having a large specific surface area can be effectively used as active carbon. The specific surface area reaches the maximum value of 1500 $m^2/g$ to 1700 $m^2/g$ for processing at 1150° C. to 1250° C. The processing at 1400° C. or higher allows for conversion of the structure of active carbon from amorphous to graphite, resulting in reduction in the surface area to 800 to 1000 $m^2/g$. The product is, however, effective for use as active carbon requiring graphite structure.

Figure 13:
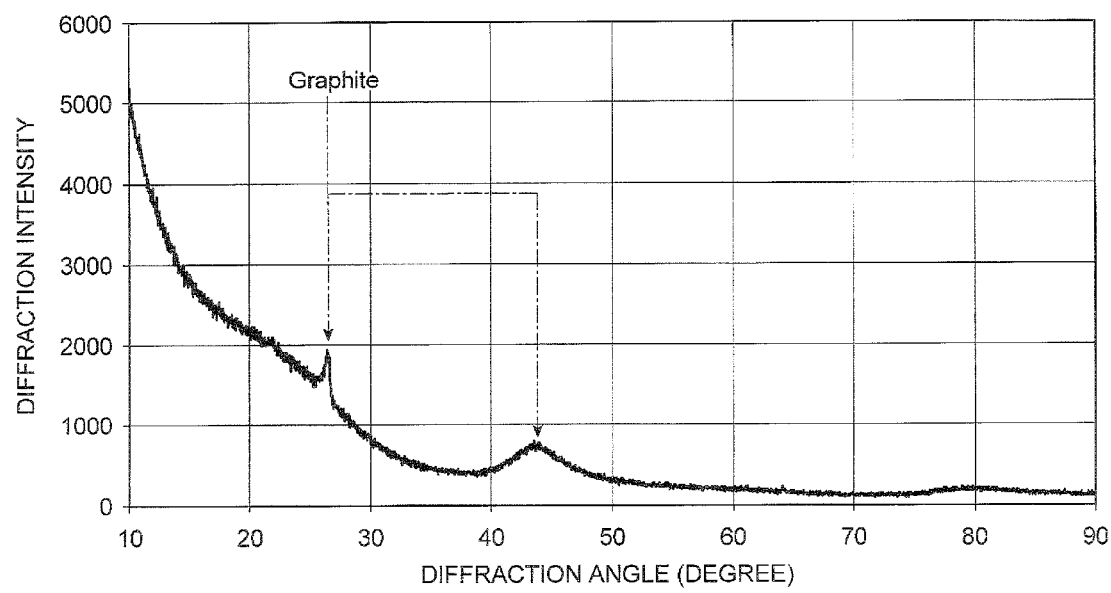
FIG. 13 is a chart showing an X-ray diffraction waveform of a porous carbon material.

FIG. 13 is a chart showing an X-ray diffraction waveform of a porous carbon material obtained by processing at 1100° C. in $Cl_2$ gas atmosphere. The abscissa represents diffraction angle, and the ordinate represents diffraction intensity (unit: CPS (count number)). As main products, the small angle scattering at less than 15° and a broad diffraction at about 20° which are specific to treated SiC, and a diffraction at about 43° caused by 01 plane of graphite are confirmed. Also, the formation of a small amount of graphite can be confirmed by the diffraction line at 26°.

Even when a small amount of metal impurities exist in the rice hull charcoal briquette M4, the contamination with metal impurities during condensation of $SiCl_4$ can be neglected in the processing of the step S5 due to the sufficiently high vapor pressure of $SiCl_4$ compared with other metal chlorides.

In the step S7 for reacting $SiCl_4$ with Zn (a fourth step), high-purity silicon metal P2 (Si) is extracted from $SiCl_4$ by a so-called zinc reduction method. More specifically, $Cl_2$ and Zn contained in $SiCl_4$ produced in the step S5 are reacted with each other, and thereby $SiCl_4$ is reduced to produce silicon metal P2 (Si). Zn in combination with $SiCl_4$ produces no solid solution with Si, and zinc chloride has a relatively low melting point and high vapor pressure, which are the reasons for choosing Zn as material. In FIG. 2, the reaction formula (3) is shown to express the reaction in the step S7. The free energy in the reaction is expressed: $\Delta G=-64$ kJ.

$$SiCl_4 + 2Zn \rightarrow 2ZnCl_2 + Si \quad (3)$$

Also, in the step S7, $SiCl_4$ and Zn are reacted in the gas phase. Zn has a boiling point of 907° C., which is relatively low among metals, with sufficient vapor pressure required for the supply by vaporization even at about 800° C. A boiling point of $ZnCl_2$ produced by the gas phase reaction is 756° C., and thus the reaction with $SiCl_4$ can be performed at a temperature of 800° C. or higher, causing no deposition of $ZnCl_2$.

In the step S9 (a fifth step), $ZnCl_2$ is electrolyzed. In the electrolysis, Zn and $Cl_2$ gas are produced from $ZnCl_2$. In FIG. 2, the reaction formula (4) is shown to express the reaction in the step S9. The free energy in the reaction is expressed: $\Delta G=+323$ kJ.

$$ZnCl_2 \rightarrow Zn + Cl_2 \quad (4)$$

In the step S9, for example, $ZnCl_2$ in a molten state at high temperature is electrolyzed to produce Zn and $Cl_2$ gas. The $Cl_2$ gas produced in the step S9 is reused in the above-described step S5 (refer to FIG. 2). Furthermore, Zn produced in the step S9 is reused in the above-described step S7 (refer to FIG. 2).

Figure 9:
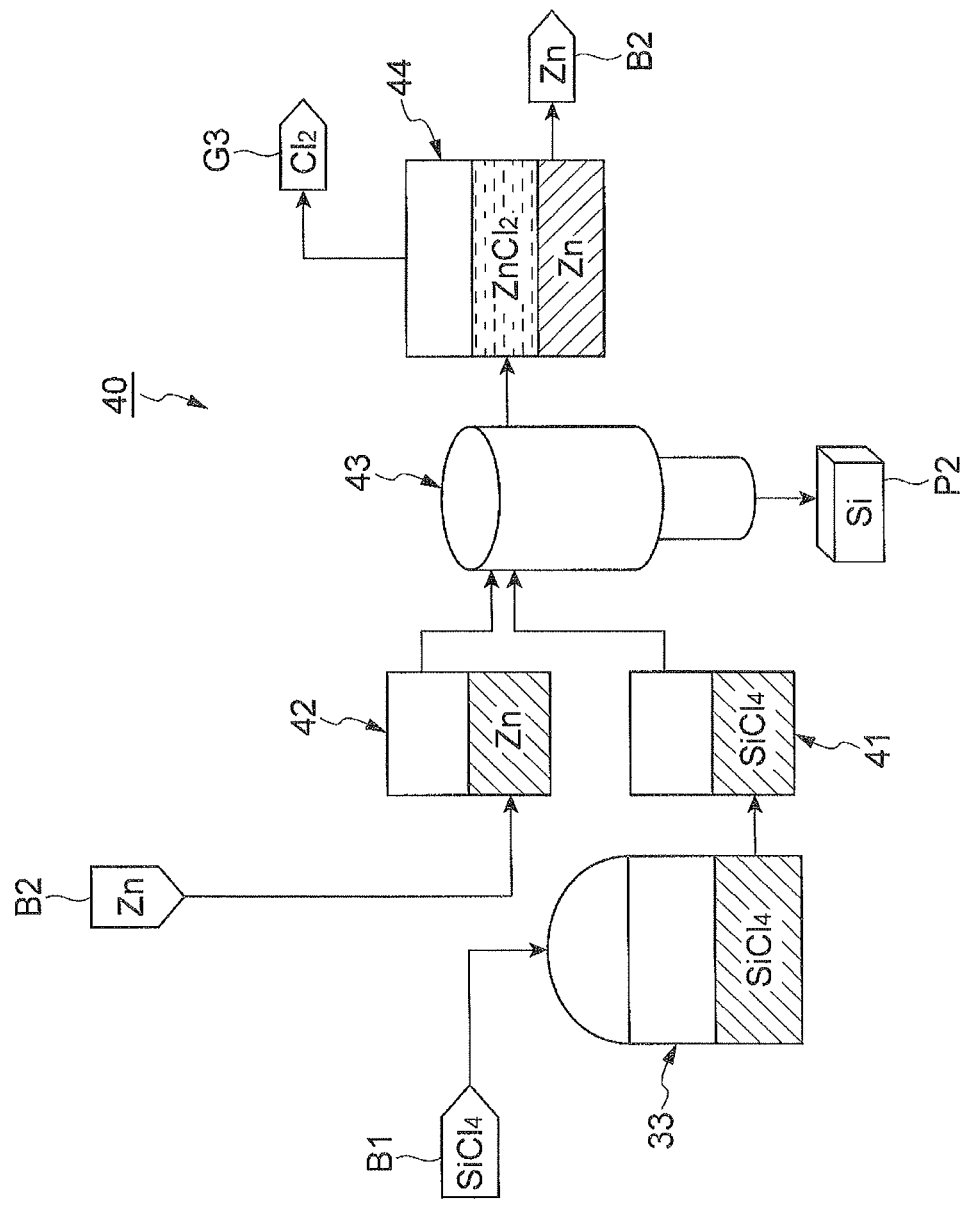
FIG. 9 is a simplified diagram showing the constitution of a zinc reduction device.
Figure 10:
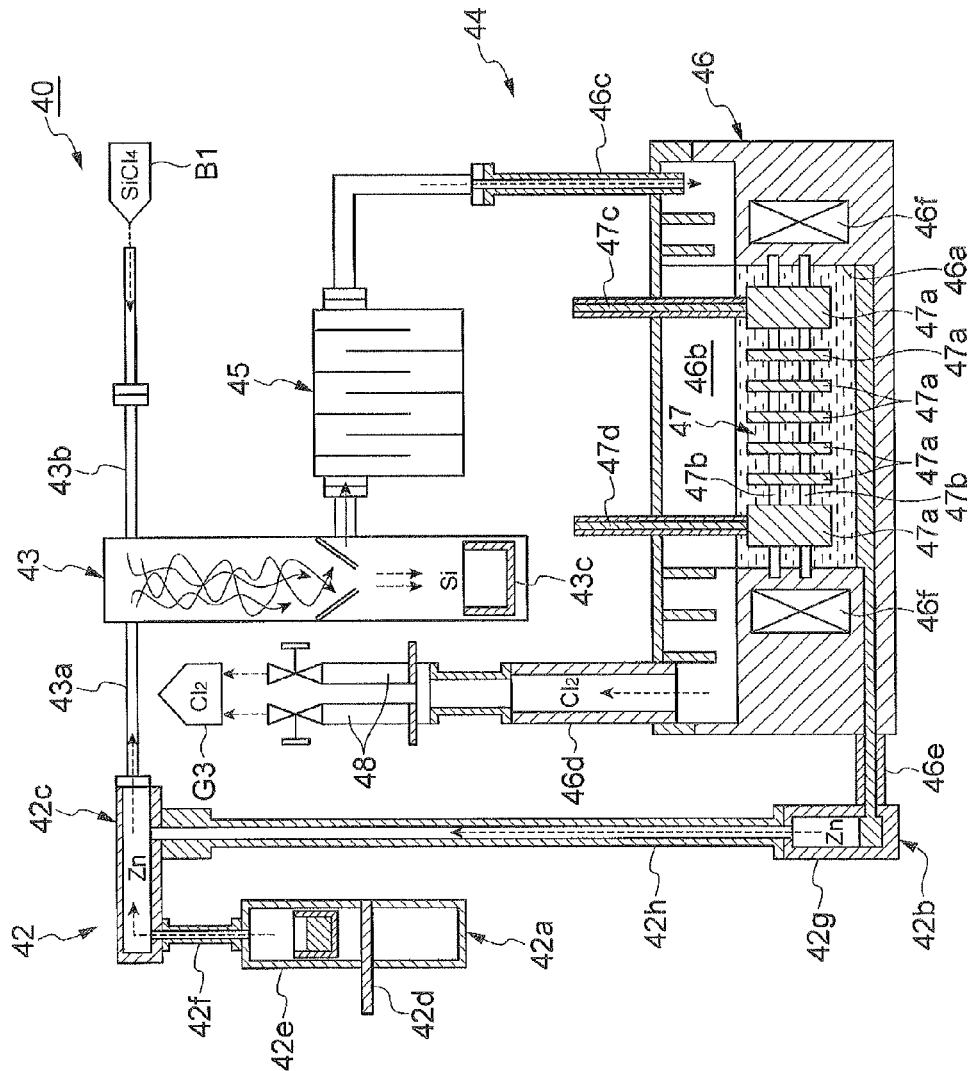
FIG. 10 is a diagram showing a specific constitution of a zinc reduction device.

FIG. 9 and FIG. 10 are schematic diagrams showing the constitution of the reduction device 40 for use in the steps S7, S8, and S9. FIG. 9 is a simplified diagram showing the constitution of the reduction device 40. FIG. 10 is a diagram showing a specific constitution of the reduction device 40.

With reference to FIG. 9, the reduction device 40 includes vaporizers 41 and 42, a reacting furnace 43, and an electrolytic tank 44. The above-mentioned $SiCl_4$ (reference symbol B1) stored in the reservoir tank 33 of the processing device 30 for processing the rice hull charcoal briquette M4 is transferred to the vaporizer 41 to be vaporized. On the other hand, Zn is vaporized at the vaporizer 42. The vaporized $SiCl_4$ and Zn are transferred to the reacting furnace 43. In the reacting furnace 43, $SiCl_4$ and Zn are reacted at high temperature. By the reaction, the above-mentioned reaction of reaction formula (3) is caused, and the silicon metal P2 and the $ZnCl_2$ are produced.

The $ZnCl_2$ is trapped at a temperature of melting point (280° C.) or higher and lower than boiling point, and transferred to the electrolytic tank 44. The $ZnCl_2$ is then electrolyzed by direct current, causing the reaction of reaction formula (4) to separate $ZnCl_2$ into Zn and $Cl_2$ gas. The produced $Cl_2$ gas is transferred as processing gas G3 to the processing device 30 for processing the rice hull charcoal briquette M4 (G3 in FIG. 8 and FIG. 9), and Zn is transferred to the vaporizer 42 (reference symbol B2 in FIG. 9).

With reference to FIG. 10, the reduction device 40 is described specifically. The vaporizer 42 of the reduction device 40 includes a vaporizer 42*a* for feeding into the system, a vaporizer 42*b* for continuous operation, and a collecting pipe 42*c*. The vaporizer 42*a* for feeding into the system has a gate valve 42*d*, capable of feeding Zn from outside the reduction device 40. Zn is accommodated in a vaporization chamber 42*e* of the vaporizer 42*a* for feeding into the system to be vaporized. The vaporization chamber 42*e* and the collecting pipe 42*c* are connected to each other through a piping 42*f*. The vaporizer 42*b* for continuous operation accommodates Zn taken out from the electrolytic tank 44, having a zinc vaporization part 42*g* for vaporizing Zn. The zinc vaporization part 42*g* and the collecting pipe 42*c* are connected to each other through a piping 42*h*.

The piping 42*h* of the vaporizer 42*a* for feeding into the system and the vaporizer 42*b* for continuous operation is made of, for example, ceramics (e.g. alumina). The zinc vaporization part 42*g* of the vaporizer 42*b* for continuous operation and the collecting pipe 42*c* are made of, for example, carbon. The vaporizer 42*a* for feeding into the system, the vaporizer 42*b* for continuous operation, and the collecting pipe 42*c* are heated to a high temperature of 800° C. or higher, for example, 900° C. to 1000° C., for efficient generation of the vapor of zinc metal.

The reacting furnace 43 is made of, for example, quartz. The upper part of the reacting furnace 43 is connected to the collecting pipe 42*c* of the vaporizer 42 through a piping 43*a* made of quartz, and vaporized Zn is transferred to the reacting furnace 43 through the piping 43*a*. $SiCl_4$ (reference symbol B1) flows into the upper part of the reacting furnace 43, through a piping 43*b* made of quartz. The reacting furnace 43 is heated to a high temperature of 1200° C. to 1400° C., and Zn and $SiCl_4$ react with each other in the interior of the reacting furnace 43. The produced silicon metal P2 is accommodated in an unheated vessel 43*c* disposed in the interior of the reacting furnace 43. $ZnCl_2$ passing through a fine particle trap 45 for removing fine particles of silicon metal P2 is transferred to the electrolytic tank 44. The fine particle trap 45 is made of, for example, quartz, and heated to a high temperature of 900° C. to 1000° C.

The purity of the produced silicon metal P2 is 99.9995%, which is an extremely high value, usable as material for solar cells. Zn and $O_2$ are identified as impurities in the silicon metal P2.

The electrolytic tank 44 includes a body part 46 and an electrode structure 47. The body part 46 includes an electrolytic tank 46a for accommodating molten $ZnCl_2$ to be electrolyzed and a heater 46f which is a heat source for heating the interior of the electrolytic tank 46a. A space 46b is provided above the electrolytic tank 46a. A piping 46c connected to the fine particle trap 45 is disposed at one end of the space 46b in the horizontal direction, and a piping 46d (demister) is disposed at another end. $ZnCl_2$ introduced from the piping 46c is conducted to the electrolytic tank 46a, The $Cl_2$ gas generated in the electrolytic tank 46a is discharged from the piping 46d through the space 46b to be supplied as the processing gas G3 to the processing device 30 for processing the rice hull charcoal briquette M4. A filter 48 made of Teflon (R) is arranged at the tip end of the piping 46d. A piping 46e is connected to the bottom of the electrolytic tank 46a, and the high purity Zn deposited on the bottom of the electrolytic tank 46a is transferred to the vaporizer 42b for continuous operation through the piping 46e.

The electrode structure 47 includes a plurality of electrode plates 47a. The plurality of electrode plates 47a are arranged with intervals in the plate thickness direction, i.e. horizontal direction, in the electrolytic tank 46a. The plurality of electrode plates 47a is made of, for example, high-purity carbon material which is a conductive material having high temperature resistance and corrosion resistance to chlorine, through which one or a plurality of bar-like members 47b extending in the horizontal direction penetrate, and the mutual positional relationship is kept.

A predetermined positive voltage is applied to the electrode plate 47a located at one end in the horizontal direction among the plurality of electrode plates 47a through a conductive member 47c electrically connected to the electrode plate 47a, and the electrode plate 47a functions as positive electrode. A predetermined negative voltage is applied to the electrode plate 47a located at another end in the horizontal direction through a conductive member 47d electrically connected to the electrode plate 47a, and the electrode plate 47a functions as negative electrode. A potential gradient between the positive voltage and the negative voltage is imparted to the electrode plates 47a arranged between the positive electrode and the negative electrode through the conductive members, and each of these electrode plates 47a functions as an intermediate electrode.

The $ZnCl_2$ introduced from the piping 46c is taken in the electrolytic tank 46a. Since the interior of the electrolytic tank 46a is kept at a temperature higher than the melting point of Zn, for example, at 500° C. to 700° C. with a heater, $ZnCl_2$ is kept in a molten state.

A plurality of electrode plates 47a are disposed in the interior of the electrolytic tank 46a, and the plurality of electrode plates 47a are immersed in the molten $ZnCl_2$. When a predetermined potential difference is applied to each of the electrode plates 47a, current flows in $ZnCl_2$ through the opposing surfaces (electrolytic surfaces) of neighboring electrode plates 47a, and $ZnCl_2$ is electrolyzed into $Cl_2$ and Zn. The thus produced Zn has a larger specific gravity than the melt of $ZnCl_2$, being deposited on the bottom of the electrolytic tank 46a and transferred to the vaporizer 42b for continuous operation through the piping 46e. The produced $Cl_2$ becomes $Cl_2$ gas, which moves upward above the electrolytic tank 46a, and is transferred to the processing device 30 for processing the rice hull charcoal briquette M4 through the piping 46d.

In this production method, rice hull charcoal M2 containing $SiO_2$ and C is produced from rice hulls M1, and SiC is produced from the rice hull charcoal M2. Subsequently, SiC and $Cl_2$ gas are reacted to produce porous carbon P1 and $SiCl_4$. Subsequently, the $SiCl_4$ and Zn are reacted to produce silicon metal P2 and $ZnCl_2$. The $Cl_2$ gas generated by electrolysis is used for production of porous carbon P1, and Zn generated by electrolysis is used for production of silicon metal P2. According to the production method, the porous carbon P1 and the silicon metal P2 can be produced from rice hulls M1.

Prior to the second step S4, the rice hull charcoal M2 is treated with an acid solution. According to the step S4, impurities contained in the rich hull charcoal M2 are removed by the treatment with an acid solution, and thus the purity of $SiO_2$ and C contained in the rice hull charcoal M2 is increased. Accordingly, since the amount of $Cl_2$ gas reacting with impurities is reduced in the third step S5, the amount of $Cl_2$ gas required in the third step S5 can be reduced.

In the second step S4, the processing gas includes $H_2$, being heated to a temperature of 1200° C. or higher and 2000° C. or lower. In the temperature range of 1200° C. or higher and 2000° C. or lower, the reaction between $SiO_2$ and C is accelerated, and thus SiC can be efficiently produced. In addition, $H_2$ gas accelerates the reaction between $SiO_2$ and C, and thus SiC can be further efficiently produced.

In the second step S4, SiC is produced under a pressure of less than 1 atm. Under a pressure in a processing vessel set to less than atmospheric pressure, impurities having low vapor pressure can be removed from the rice hull charcoal M2.

In the third step S5, the heating atmosphere includes a mixed gas of $Cl_2$ gas and a second inert gas or a substantially 100% $Cl_2$ gas. Such a heating atmosphere can accelerate the proper reaction.

In the third step S5, the atmosphere including $Cl_2$ gas is heated to a temperature of 1000° C. or higher and 1600° C. or lower. The heating atmosphere at a temperature of 1000° C. or higher can accelerate the reaction between $Cl_2$ gas and SiC. The heating atmosphere at a temperature of 1600° C. or lower can prevent the structure of produced porous carbon P1 from being graphitized and suppress the reduction in specific surface area of the porous carbon P1.

The fourth step S7 includes the steps of heating $SiCl_4$ to a temperature of 600° C. or higher and 1100° C. or lower to generate $SiCl_4$ gas, reacting the $SiCl_4$ gas and Zn vapor to produce silicon metal P2 and $ZnCl_2$, and cooling $ZnCl_2$ to liquefy $ZnCl_2$. The reaction between $SiCl_4$ and Zn can be accelerated.

In the third step S5, the $SiCl_4$ gas is discharged from the heating atmosphere to separate $SiCl_4$ from the porous carbon P1. The porous carbon P1 and the $SiCl_4$ can be easily separated.

In the fourth step S7, the $ZnCl_2$ gas is discharged from the heating atmosphere to separate the $ZnCl_2$ from the silicon metal P1. The silicon metal P1 can be easily separated from the $ZnCl_2$.

In the present embodiment, after producing the rice hull charcoal M2 containing $SiO_2$ from rice hulls M1, SiC is produced from $SiO_2$. The process for producing SiC via rice hull charcoal M2 containing SiO$_2$ allows for addition of the step S2 for removing impurities when the rice hull charcoal M2 is produced. Accordingly, the rice hull charcoal briquettes M4 containing SiC can be produced without use of a complicated device for processing a large amount of organic decomposition product gas such as methane and carbon monoxide generated during processing of the rice hulls M1. Furthermore, the first step S1 for producing the rice hull charcoal M2 containing SiO$_2$ and the second step S4 for producing SiC from SiO$_2$ can be combined to simplify the constitution of the device.

Although the above description is limited to the case of rice hull raw material, the similar processing may be applied to a material derived from silicic acid-containing plant other than rice hulls. Examples of the material derived from silicic acid-containing plant other than rice hulls include rice straws and diatoms.

INDUSTRIAL APPLICABILITY

The present invention is applicable to a method for producing silicon metal and porous carbon, providing a method for producing silicon metal and porous carbon from rice hulls.

REFERENCE SIGNS LIST

10 . . . rice hull processing device; 20, 30 . . . processing device for processing rice hull charcoal; 40 . . . reduction device; S1 . . . first step; S4 . . . second step; S5 . . . third step; S7 . . . fourth step; S9 . . . fifth step; G2 . . . processing gas (first inert gas, reducing gas); M1 . . . rice hull; M2 . . . rice hull charcoal; M3, M4 . . . rice hull charcoal briquette; P1 . . . , porous carbon; P2 . . . silicon metal.

What is claimed is:

1. A method for producing silicon metal and porous carbon comprising:
    a first step of producing a rice hull charcoal containing silicon oxide and carbon by heat treatment of rice hulls;
    a second step of exposing the rice hull charcoal to at least any one of heated first inert gas or reducing gas to produce silicon carbide;
    a third step of exposing the silicon carbide to a heating atmosphere containing chlorine gas to produce silicon chloride and porous carbon;
    a fourth step of reacting the silicon chloride and zinc metal to produce silicon metal and zinc chloride; and
    a fifth step of electrolyzing the zinc chloride to produce zinc metal and chlorine gas;
    wherein the chlorine gas in the fifth step is used in the third step, and the zinc metal in the fifth step is used in the fourth step,
    wherein the fourth step comprises:
        a step of heating the silicon chloride to a temperature of 600° C. or higher and 1100° C. or lower to generate gas of the silicon chloride;
        a step of reacting the gas of silicon chloride with vapor of the zinc metal to produce the silicon metal and the zinc chloride; and
        a step of cooling the zinc chloride to liquefy the zinc chloride.

2. The method for producing silicon metal and porous carbon according to claim 1,
    wherein, in the first step, a number of moles of carbon is triple or more a number of moles of SiO$_2$ in the composition of the rice hull charcoal produced.

3. The method for producing silicon metal and porous carbon according to claim 1, wherein the rice hull charcoal is treated with an acid solution prior to the second step.

4. The method for producing silicon metal and porous carbon according to claim 1,
    wherein, in the second step, the first inert gas contains at least one of Ar and He, and the rice hull charcoal produced in the first step is heated to a temperature of 1200° C. or higher and 2000° C. or lower.

5. The method for producing silicon metal and porous carbon according to claim 1,
    wherein, in the second step, the reducing gas contains one of H$_2$ and CO, and the rice hull charcoal produced in the first step is heated to a temperature of 1200° C. or higher and 2000° C. or lower.

6. The method for producing silicon metal and porous carbon according to claim 1,
    wherein, in the second step, the silicon carbide is produced under a pressure of less than 1 atm.

7. The method for producing silicon metal and porous carbon according to claim 1,
    wherein, in the third step, the atmosphere containing chlorine gas is heated to a temperature of 1000° C. or higher and 1600° C. or lower.

8. The method for producing silicon metal and porous carbon according to claim 1,
    wherein, in the third step, the gas of silicon chloride is discharged from the heating atmosphere to separate the silicon chloride from the porous carbon.

9. The method for producing silicon metal and porous carbon according to claim 1,
    wherein, in the fourth step, gas of the zinc chloride is discharged from the atmosphere containing the gas of silicon chloride and vapor of the zinc metal to separate the zinc chloride from the silicon metal.

10. The method for producing silicon metal and porous carbon according to claim 1,
    wherein, in the third step, the heating atmosphere contains a mixed gas of the chlorine gas and a second inert gas or chlorine gas.

* * * * *